United States Patent Office 2,762,844
Patented Sept. 11, 1956

2,762,844

PREPARATION OF OXIMES FROM CYCLO-ALIPHATIC NITROCOMPOUNDS

Sjoerd Kaarsemaker, Sittard, Netherlands, assignor to Stamicarbon N. V., Heerlen, Netherlands No Drawing. Application January 25, 1955,
Serial No. 484,080

Claims priority, application Netherlands January 28, 1954

8 Claims. (Cl. 260—566)

The present invention relates to the preparation of oximes from aliphatic and cyclo-aliphatic nitrocompounds.

It is well known that oximes can be obtained by reducing the corresponding aliphatic and cyclo-aliphatic nitrocompounds in the liquid phase with hydrogen. This reduction can be carried out either with hydrogen-yielding reducing agents or catalytically with gaseous hydrogen.

It has now been found that aliphatic and cyclo-aliphatic nitrocompounds can also be reduced in the vapor phase to give the corresponding oximes. Accordingly, the principal object of the present invention is to provide a novel process for producing oximes by reducing aliphatic and cyclo-aliphatic nitrocompounds. Other objects will also be hereinafter apparent.

According to the invention, oximes are prepared from aliphatic and cyclo-aliphatic nitrocompounds by a process which comprises contacting the nitro-compound with an alkaline-reacting solid salt of a weak acid at a temperature of 150 to 350° C.

When following the present process, as outlined above, water is found in the resulting reaction product, thus suggesting that the oxime formation is effected by splitting off water from the nitrocompound. If this were the case, however, the oximes formed from, e. g., nitrocyclohexane, would be largely, if not entirely, unsaturated, whereas it has been surprisingly found that the resulting reaction products actually consist substantially of the corresponding saturated oximes, the amount of unsaturated oximes usually being not greater than 20–30%.

Preferably, the vapor of the nitrocompound is mixed with an inert carrier gas, for example water vapor, carbon dioxide or nitrogen. Reactive gases, such as oxygen and carbon monoxide, should not be used. Hydrogen may also be used as the carrier since it has been found that, when operating under the conditions of the present process, hydrogen is practically inert in the absence of a hydrogenating catalyst. This is established by the fact that the use of hydrogen as a carrier gas does not give a marked increase in the yield of saturated oximes when compared with the other inert gases referred to above, e. g., nitrogen. Accordingly, it follows that by employing hydrogen in this manner hardly any hydrogenation is effected and the hydrogen can be regarded as an inert gas.

The amount of carrier gas to be employed may vary considerably. However, as a rule, large amounts of carrier gas are used, so that the vapor of the nitrocompound does not constitute more than 5–10% by volume of the gas mixture.

As indicated above, the temperature at which the reaction is carried out should fall within the range of 150 to 350° C. Higher temperatures should be avoided to prevent the formation of undesirable by-products which render the alkaline reacting solid salt constituting the contact mass inactive. Preferably, the temperature utilized is 225 to 275° C., within which range a fast reaction rate is obtained, so that contact periods of less than 5 seconds are possible. Operation within the preferred temperature range also makes it possible to avoid the deposition of more than just minor amounts of by-products on the contact mass.

Alkaline-reacting solid salts of weak acids suitable for use according to the invention are the carbonates, aluminates, borates or other alkaline reacting salts of alkali metals, alkaline earth metals or other basic metals. Examples of these salts are: sodium carbonate, potassium carbonate, rubidium carrbonate, calcium carbonate, barium carbonate, zinc carbonate, magnesium carbonate, thallium carbonate, cadmium carbonate, sodium aluminate, sodium borate, potassium borate, manganic carbonate and other salts of weak acids which do not decompose at the reaction temperature. Mixtures of these salts may also be used.

The carbonates of the alkali metals, such as potassium carbonate and rubidium carbonate, are especially suitable contact substances with which the reaction proceeds rapidly.

The salt may be fixed on a solid carrier or support which may be a salt of the type referred to above, for example, calcium carbonate or some other material. Good results are obtained with carriers comprising metal oxides, such as zinc oxides, manganic oxide and cadmium oxide. When employing a solid carrier, the same is generally used in an amount such that the salt constitutes at least 2%, but no more than 10% by weight of the contact material.

According to the invention, the vapors of the nitrocompound may be contacted with the salt by passing the vapor through a particulate layer of salt-carrying contact material. In this case, the diameter of the solid particles is usually chosen between 3 and 5 mm. Coarser particles of an irregular shape may also be used to advantage. It is also possible to keep the solid substance in motion during the reaction. Thus, the finely divided solid substance with a particle diameter of, for example, less than 0.1 mm., may be brought into contact with the vapor in the fluidized state. A procedure of this sort wherein the solid contact material is in the fluidized state has the advantage that local overheating thereof is avoided with the result that the temperature can be easily kept constant and the reaction can proceed without any difficulty.

The process according to the invention can be carried out continuously and the solid contact material can be regenerated for the purpose of removing undesirable products deposited thereon. Regeneration may be effected in any convenient manner, e. g., by passing an oxygen-containing gas, such as air, over the contact mass. The regenerating gas may be mixed with an inert gas, for example, nitrogen or steam, to avoid high temperature rises during regeneration. The regeneration may be carried out in such a way that the solid substance is kept in the fluidized state as, for example, by means of the regenerating gas.

The oxime can be separated from the gaseous reaction products by cooling, after which the oxime may be purified, for example, by distillation. The carrier gas, if utilized, may be recycled.

It has been found that the yield of saturated oxime can be increased by hydrogenation of any unsaturated oxime present in the reaction product. To this end, the reaction product may be subjected to a hydrogenation treatment with hydrogen and a hydrogenation catalyst, for example, palladium. This hydrogenation is preferably carried out at atmospheric pressure and at a temperature of 15–25° C. Higher temperatures, e. g., 50–100° C. may also be used satisfactorily.

As will be appreciated, the time of contact between the salt and nitrocompound vapors can be widely varied.

Under preferred operations, however, from 2 to 10 grams of nitrocompound per gram of salt should be contacted per hour.

Any aliphatic or cyclo-aliphatic nitrocompound capable of being reduced to form the corresponding oxime may be used in the present process. Examples of suitable nitrocompounds are the aliphatic and cyclic mononitro paraffins, such as nitro-ethane, secondary nitro-propane, nitro-cyclohexane, methyl nitro-cyclohexane and nitro-cycloheptane.

The results are given in the following table. In this table the amount of nitro-cyclohexane, led through the catalyst mass by means of the carrier gas, is expressed in grams per kg. of catalyst per hour.

The conversion is expressed in per cent by weight of the amount of nitro-cyclohexane supplied. The yield is expressed in per cent by weight of oxime formed, calculated on the converted quantity of nitro-cyclohexane. The percentage of salt in the catalyst is also expressed in per cent by weight.

| CATALYST | | | Gasmixture | | Temp., °C | Conversion, Percent | Oxime yield, Percent |
|---|---|---|---|---|---|---|---|
| Salt | Carrier | Percent salt | Carrier gas | Nitro-cyclohexane, g./kg. cat./h. | | | |
| Potassium carbonate $K_2CO_3$ | Zinc oxide ZnO | 2.3 | Nitrogen | 117 | 250 | 98 | 60 |
| Potassium metaborate $KBO_2$ | ZnO | 3.5 | do | 258 | 250 | 86 | 53 |
| Rubidium carbonate $Rb_2CO_3$ | ZnO | 4.4 | do | 168 | 250 | 87 | 62 |
| Sodium carbonate $Na_2CO_3$ | ZnO | 17.0 | Hydrogen | 168 | 250 | 73 | 65 |
| Calcium carbonate $CaCO_3$ | ZnO | 10.1 | do | 155 | 250 | 47 | 59 |
| Potassium carbonate $K_2CO_3$ | Cadmium oxide CdO | 5.9 | do | 580 | 300 | 83 | 67 |
| $K_2CO_3$ | Manganic oxide MnO | 4.0 | Nitrogen | 296 | 250 | 99 | 61 |
| $K_2CO_3$ | Activated coal | 10.0 | Hydrogen | 720 | 250 | 21 | 74 |
| $K_2CO_3$ | Aluminum silicate | 4.0 | Nitrogen | 515 | 229 | 45 | 37 |

*Example I*

This example illustrates the use of a contact mass comprising potassium carbonate fixed on zinc oxide as a carrier.

Zinc carbonate was freshly prepared by precipitating it from an aqueous zinc nitrate solution. This was accomplished by adding an aqueous potassium bicarbonate solution to the nitrate solution. The precipitate formed was removed by filtration and washed with water. 1000 g. of the moist product was added to a solution of 60 g. of potassium bicarbonate in 500 g. of water. After filtering and drying, the product was tableted and next crushed to grains of 3–5 mm. in diameter. These grains were heated in a current of air at 400° C. for 4 hours. The catalyst or contact mass thus formed contained 8% by weight of potassium carbonate and 92% by weight of zinc oxide.

38 g. of this catalyst was introduced into a reaction tube (diameter 20 mm.) and heated to a reaction temperature of 250° C.

A gas mixture was prepared continuously by evaporating 7.25 g. of water at a temperature of 80° C. and 7.25 g. of nitro-cyclohexane at a temperature of 110° C. per hour in 14 l. of nitrogen (measured at 0° C. and 1 atmosphere). After being preheated, this gas mixture was passed through a reaction tube and the gases issuing from the tube were cooled, which treatment yielded 3.2 g. of oxime per hour. In this manner 90% of the nitro-cyclohexane was converted, the oxime yield, calculated on converted nitro-cyclohexane, being 56 per cent by weight.

*Example II*

In a manner similar to that described in Example I, a number of experiments were carried out with various catalysts. The catalysts were prepared in an analogous manner by impregnating the freshly prepared carrier (see Example I).

I claim:
1. A process for preparing cyclohexanone oxime from nitrocyclohexane which comprises contacting the nitrocompound in the vapor phase with a salt selected from the group consisting of the alkali metal and alkaline earth metal carbonates and borates at a temperature of 150 to 350° C.
2. The process of claim 1 wherein the nitro-compound is mixed with an inert carrier gas before it is brought into contact with said salt.
3. The process of claim 1 wherein the temperature is between 225 and 275° C.
4. The process of claim 1 wherein said salt is an alkali metal carbonate.
5. The process of claim 1 wherein the salt is fixed on a metal oxide carrier.
6. A process for preparing cyclohexanone oxime from nitrocyclohexane which comprises contacting a vaporous mixture of the nitro-compound and an inert gas with a contact mass consisting essentially of an alkali metal carbonate supported on a metal oxide carrier, at a temperature of between 225 and 275° C. and at a contact rate equal to 2 to 10 grams of nitrocompound per gram of alkali metal carbonate, and thereafter cooling the resulting gaseous mixture to recover said oxime.
7. The process of claim 6 wherein said carbonate comprises from 2 to 10% by weight of said contact mass.
8. The process of claim 6 wherein no more than from 5 to 10% of said vaporous mixture is nitro-compound.

References Cited in the file of this patent
UNITED STATES PATENTS

| | | |
|---|---|---|
| 2,233,823 | Susie et al. | Mar. 4, 1941 |
| 2,634,269 | England | Apr. 7, 1953 |
| 2,638,482 | Grundmann | May 12, 1953 |
| 2,709,179 | Ottenheyn | May 24, 1955 |
| 2,711,427 | Christian | June 21, 1955 |

OTHER REFERENCES

Richter: "Org. Chem." vol. I (1944), pp. 267–68.